(12) United States Patent
Nae et al.

(10) Patent No.: US 10,220,735 B1
(45) Date of Patent: Mar. 5, 2019

(54) FOLDING ANCHOR BRACKET FOR ATTACHING A CHILD SAFETY SEAT TO A VEHICLE SEAT

(71) Applicant: GM GLOBAL TECHNOLOGY OPERATIONS LLC, Detroit, MI (US)

(72) Inventors: Dumitru D. Nae, Troy, MI (US); Marco A. Vitale, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/696,542

(22) Filed: Sep. 6, 2017

(51) Int. Cl.
*B60N 2/28* (2006.01)
*B60N 2/30* (2006.01)

(52) U.S. Cl.
CPC .......... *B60N 2/2893* (2013.01); *B60N 2/3011* (2013.01)

(58) Field of Classification Search
CPC .... B60N 2/289; B60N 2/2893; B60N 2/3011; B60N 2/2887
USPC .............................. 297/253; 16/308, 374, 277
See application file for complete search history.

(56) References Cited

U.S. PATENT DOCUMENTS

| | | | | |
|---|---|---|---|---|
| 3,402,508 A | * | 9/1968 | Kessler ................. | E05F 1/123 16/308 |
| 6,082,818 A | * | 7/2000 | Muller .................... | B60N 2/28 297/250.1 |
| 6,196,628 B1 | * | 3/2001 | Goy ..................... | B60N 2/2821 297/250.1 |
| 6,390,560 B1 | * | 5/2002 | Gandhi ................... | B60N 2/28 297/253 |
| 6,604,793 B2 | * | 8/2003 | Habedank ............... | B60N 2/28 297/463.1 |
| 7,178,873 B2 | * | 2/2007 | Foelster ............... | B60N 2/2893 297/253 |
| 7,533,934 B2 | * | 5/2009 | Foelster ............... | B60N 2/2893 297/253 |
| 2004/0080194 A1 | * | 4/2004 | Medvecky ........... | B60N 2/2887 297/253 |
| 2012/0023706 A1 | * | 2/2012 | Fuller .................... | E05D 11/06 16/374 |

* cited by examiner

*Primary Examiner* — Milton Nelson, Jr.

(57) ABSTRACT

A bracket for connection of a child safety seat to a foldable vehicle seat includes a wire with a first leg, a second leg and a horizontal attachment portion. The attachment portion is connected to the first leg and the second leg and is configured to connect to the child safety seat when the attachment portion is in a first position. The bracket also includes a support member connected to the first and second leg. The support member is configured to couple the wire to the vehicle seat while permitting movement of the attachment portion from the first position to a second position, wherein the first position is different from the second position. The bracket also includes a biasing member in contact with at least one of the support member and the wire and is configured to bias the attachment portion of the wire toward the first position.

9 Claims, 5 Drawing Sheets

FOLDING ANCHOR BRACKET FOR ATTACHING A CHILD SAFETY SEAT TO A VEHICLE SEAT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to folding anchor brackets for attaching a child safety seat to a vehicle seat.

Vehicles often include child safety seat anchors so that child safety seats can be quickly and safely secured inside of the vehicle. The characteristics of child safety seat anchors, such as size and location, are often standardized across vehicles so that the anchoring system on the child safety seat will work in the same manner, with the same ease and safety, on every vehicle that has adopted the standardized anchoring system. In one standardized system, anchoring locations are provided in vehicles at or near the intersection of seat bottom cushions and seat back cushions. The anchoring locations that a child safety seat is attached to are often positioned in a gap that exists between these two cushions.

Since the characteristics of the child safety seat anchors are standardized across vehicles, the child safety seat anchors need to function with all types of seats that may exist in the vehicles. One type of seat often found in vehicles is a folding seat. This means that the seat back cushion can be rotated downward toward the seat bottom cushion. In some foldable seats, the seat bottom cushion and the seat back cushion may move in such a way such that the seat back cushion is left in a position where it is substantially parallel with the floor and disposed in a cargo area beneath the floor. Such a seat is considered a fold flat seat. Child safety seat anchors exist on traditional vehicle seats and on such fold flat seats.

SUMMARY

A bracket for connection of a child safety seat to a foldable vehicle seat in accordance with the present disclosure includes a wire with a first leg, a second leg and a horizontal attachment portion. The horizontal attachment portion is connected to the first leg and the second leg and is configured to connect to the child safety seat when the attachment portion is in a first position. The bracket also includes a support member connected to the first leg and the second leg. The support member is configured to couple the wire to the vehicle seat while permitting movement of the attachment portion from the first position to a second position, wherein the first position is different from the second position. The bracket also includes a biasing member in contact with at least one of the support member and the wire and is configured to bias the attachment portion of the wire toward the first position.

In one aspect, the support member has a travel-limiting surface. The travel-limiting surface engages a wall on a support member of the foldable vehicle seat to prevent movement of the attachment portion past the first position when the attachment portion is moved from the second position toward the first position.

In one aspect, the support member further includes a first wall, a second wall, and a back wall connected to the first wall and the second wall. The first wall disposed orthogonally to the back wall to define a first corner and the second wall disposed orthogonally to the back wall to define a second corner, wherein the first leg is connected to the support member at the first corner and the second leg is connected to the support member at the second corner.

In one aspect, the bracket further includes a cylindrical post, wherein a first end of the post is inserted through a first opening in the first wall and a second end of the post is inserted through a second opening in the second wall to define an axis of rotation of the bracket such that the attachment portion is rotated from the first position to the second position about the axis of rotation.

In one aspect, the post is oriented parallel to the attachment portion of the wire.

In one aspect, the biasing member is a torsion spring located on the post.

In one aspect, the travel-limiting surface is located on a limiting wall, the limiting wall connected to and extending from the back wall and disposed between the first wall and the second wall.

In one aspect, the bracket further includes a connector member. The connector member including a base, a third wall and a fourth wall, wherein the third wall and the fourth wall are connected to the base and extend orthogonally therefrom. The base is configured to connect to the vehicle seat and the third wall and the fourth wall define openings receiving the first end and the second end of the post to rotatably connect the support member to the connector member.

In one aspect, the travel-limiting surface contacts the base of the connector member when the attachment portion is in the first position.

In one aspect, when the attachment portion moves from the first position to the second position, the wire does not interfere with the foldable vehicle seat.

In one aspect, the support member is cylindrical with a center axis defining an axis of rotation oriented parallel to the attachment portion of the wire and configured such that the attachment portion moves from the first position to the second position by rotating about the axis of rotation.

In one aspect, the first leg and the second leg each include a linear portion and an arcuate portion. The first leg and the second leg are connected to the support member at the arcuate portion.

In one aspect, the first leg and the second leg each include an arcuate portion extending from the attachment portion. The arcuate portions of the first leg and the second leg are disposed coaxially with the support member.

In one aspect, the biasing member is a torsion spring.

In one aspect, the travel-limiting surface is located at an edge of a circumferential slot in the support member and the wall on the support member of the foldable vehicle seat is a projection that protrudes into the circumferential slot.

In one aspect, the first leg and the second leg each include a transition portion. The transition portions are disposed between the linear portions and the arcuate portions. The transition portions are angled toward each other such that a first distance between the arcuate portions is less than a second distance between the arcuate portions.

A foldable vehicle seat that is configured to fold from an upright state to a folded state in accordance with the present disclosure includes a cylindrical transverse support bar and a bracket surrounding the cylindrical transverse support bar. The bracket includes a wire with an attachment portion connected to a first leg and a second leg. The attachment portion is configured to connect to a child safety seat in a first position. The bracket also includes a support member connected to the first leg and the second leg. The support member is cylindrical in shape and surrounds the cylindrical transverse support bar such that the attachment portion can rotate from the first position to a second position, wherein the attachment portion of the wire does not interfere with the foldable vehicle seat in the folded state when the attachment portion is in the second position. The bracket also includes a biasing member in contact with at least one of the support member and the wire and is configured to bias the attachment portion of the wire toward the first position.

In one aspect, the foldable vehicle seat also includes a projection attached to the cylindrical transverse support bar, wherein the support member defines a slot through which the projection extends, and the slot has a travel-limiting surface that contacts the projection when the attachment portion is in the first position such that the attachment portion is prevented from rotating past the first position when the attachment portion is moved from the second position to the first position.

In one aspect, the first leg and the second leg include arcuate portions that wrap around the cylindrical transverse support bar.

In one aspect, the biasing member is a torsion spring with a first end and a second end. The first end is connected to the cylindrical transverse support bar and the second end contacts the first leg of the wire.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Child safety seat anchors are often included with folding seats in the second and third rows of vehicles. The child safety seat anchors that are located at the intersection of the seat bottom cushion and the seat back cushion can interfere with the seat cushions, the seat trim or other components of the foldable seat. This interference can be troublesome when the seat back cushion is moved from an upright position to a folded position, and is particularly troublesome for fold flat seats since the seat cushions can move in a translational direction (i.e., forward or backwards) in addition to moving up and down. In such instances, the child safety seat anchors can contact, press or otherwise interfere with the seat components and create undesirable deformation or damage to the seat components.

The folding anchor bracket of the present disclosure is able to fold such that it does not interfere with surrounding components in a vehicle or cause aesthetic issues. The folding anchor bracket provides an attachment point for a child safety seat when the bracket is in a first or upright position and the seat back is in an upright position. When the foldable seat back is moved to a folded position, the folding child safety seat anchor bracket can move to a second or rotated position where the bracket does not interfere with any of the surrounding seat components, which would otherwise occur if the bracket had remained in the first position.

Figure 1:
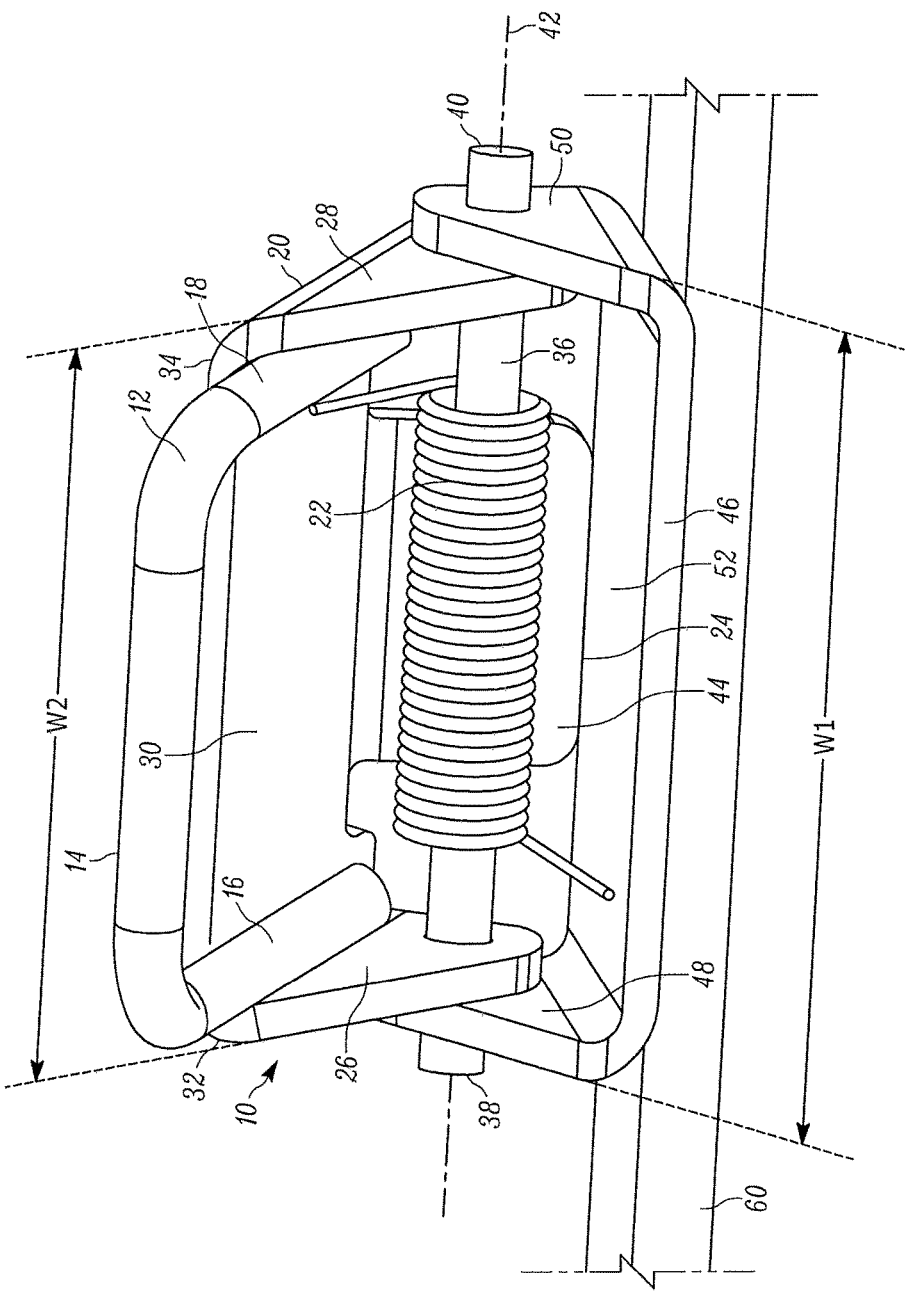
FIG. 1 is a perspective view of one example bracket of the present disclosure.

FIG. 1 shows a first embodiment of an anchor bracket 10. The bracket 10 includes a wire 12, a support member 20, a biasing member 22, a connector member 46 and a post 36. The wire 12 is connected to the bracket 10 and is the component of the bracket 10 that provides the attachment point for a child safety seat. In this example, the wire 12 is a formed length of steel wire. In other examples, the wire 12 can be stamped, formed or otherwise shaped or assembled to have the elements as will be described. As shown, the wire 12 includes an attachment portion 14, a first leg 16 and a second leg 18. The attachment portion 14 is a horizontal length of the wire 12 that provides the attachment location for the child safety seat. The first leg 16 and the second leg 18 extend away from the attachment portion 14 and connect the attachment portion 14 to a support member 20. In this example, the first leg 16 and the second leg 18 extend substantially orthogonally from attachment portion 14 as shown. The first leg 16 and the second leg 18 are rigidly connected the support member 20 in this example. Any suitable method of attachment can be used such as welding or the like.

As further shown in FIG. 1, the first leg 16 and the second leg 18 are connected to the support member 20 at a first corner 32 and a second corner 34, respectively. The support member 20 of the bracket 10 retains the wire 12 in position and facilitates the movement of the wire 12 as will be described. In this example, the support member 20 includes a first wall 26, a second wall 28 and a back wall 30. The first wall 26 and the second wall 28 are triangular in shape and are each connected to and separated by the back wall 30. The first corner 32 and the second corner 34 are located at the intersection of the first wall 26 and the back wall 30 and the intersection of the second wall 28 and the back wall 30, respectively. The first wall 26 and the second wall 28 are each oriented substantially orthogonally to the back wall 30.

The first wall 26 and the second wall 28 may also include holes through which the post 36 can be inserted. As shown in FIG. 1, a first end 38 of the post 36 is inserted through a hole in the first wall 26 and a second end 40 of the post 36 is installed in a hole through the second wall 28. In this manner, the support member 20, and in turn the wire 12, can rotate about a central axis 42. The post 36, in this example, is a cylindrical hinge member for the bracket 10. In addition to serving as an axis of rotation, the post 36 connects the support member 20 to the connector member 46.

In other examples, the bracket 10 may have a different feature (or multiple features) that serves as the axis of rotation of the support member 20. For example, the bracket 10 can include a fastener, rivet, grommet or other connection feature that connects the support member 20 to the connector member 46 instead of the post 36. In these alternate examples, the central axis 42 is created by the fastener, rivet, grommet or other connection feature on each side of the support member 20.

The bracket 10, in the example of FIG. 1, also includes the connector member 46. The connector member 46 connects the bracket 10 to a desired location in a vehicle such as to a support tube 60. The connector member 46, in this example, includes a third wall 48, a fourth wall 50 and a base 52. The third wall 48 and the fourth wall 50 are triangular in shape and are oriented substantially orthogonally to the base 52. The connector member 46 has an overall width W1 that is larger than a width W2 of the support member 20. When connected to the support member 20 by the post 36, the third wall 48 and the fourth wall 50 reside outside of the first wall 26 and the second wall 28. In other embodiments, the connector member 46 can have a smaller width than that of the support member 20 and can be connected inside of the first wall 26 and the second wall 28. A hole in the third wall 48 and a hole in the fourth wall 50 are coaxially aligned with the holes in the first wall 26 and the second wall 28 such that the post 36 can be inserted through all four walls to create the axis of rotation for the bracket 10 as previously described. In this configuration, the attachment portion 14 is oriented substantially parallel to the post 36 and the central axis 42.

The biasing member 22 serves to bias the attachment portion 14 of wire 12 in a desired position. As shown, the biasing member 22 can be a torsion spring. The torsion spring can be located on the post 36 with a first spring end 62 contacting the base 52 and a second spring end 64 contacting the back wall 30. In this manner, a force is exerted on the back wall 30 that biases the attachment portion 14 into the upright or first position as shown. As can be appreciated, if a force is exerted on an outer side of the back wall 30 or on the attachment portion 14 in a downward direction, the support member 20 and the wire 12 moves and rotates downward away from its original position. Once the downward force is removed, the biasing member 22 (the torsion spring in this example) returns the support member 20 and the wire 12 back upward toward its original upright position. While a torsion spring is shown in this example, alternate embodiments of the biasing member 22 can also be used such as other springs, elastomeric components or other flexible members joined to or contacting the support member 20 and/or the wire 12.

The bracket 10 also includes a travel-limiting surface 24. The travel-limiting surface 24 is a surface of the bracket 10 that stops the support member 20 and the wire 12 from rotating beyond a desired position. As shown in this example, the support member 20 includes a limiting wall 44 extending from the back wall 30 between the first wall 26 and the second wall 28. The travel-limiting surface 24 is located on a leading edge of the limiting wall 44 and contacts the base 52 of the connector member 46 when the support member 20 rotates in an upward direction. The travel-limiting surface 24 is a hard stop that limits rotation of the support member 20. At the limited position, the attachment portion 14 is oriented and positioned at a desired location. The combination of the biasing member 22 and the travel-limiting surface 24 ensures that the attachment portion 14 returns to its desired position after it is rotated or moved downward in response to external forces as previously described.

In other embodiments of the bracket 10, other shapes and configurations of the travel-limiting surface 24 may also be used. Other example travel-limiting surfaces can be located on limiting walls of different shapes or in different orientations. In one example, the travel-limiting surface 24 is located on the first wall 26 or on the second wall 28. In other examples, an extension arm or other elongated feature can be used to create the same functionality as the limiting wall 44 and the travel-limiting surface 24. In still other examples, a projection or extension can be added to the support member 20 or to the connector member 46 that would limit the movement of the support member 20 relative to the connector member 46.

Figure 2:
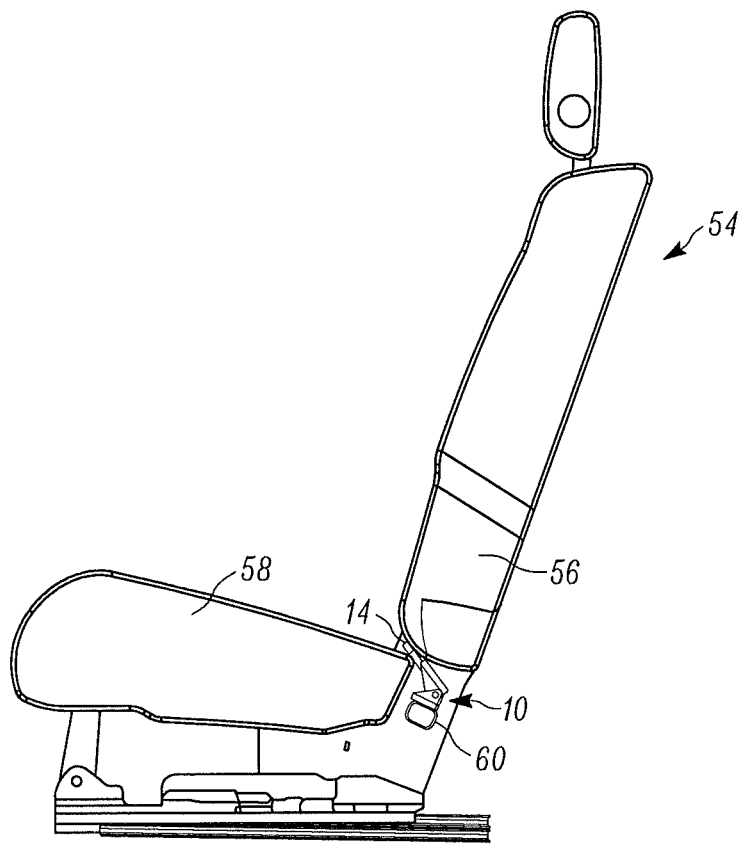
FIG. 2 is a side view of the bracket of FIG. 1 shown as attached to an example vehicle seat.

Referring now to FIG. 2, the bracket 10 is connected to a seat 54 of a vehicle. As shown, the bracket 10 is connected to the rectangular support tube 60 of the seat 54 in this example. The base 52 of the bracket 10 is connected to the support tube 60 by welding the base 52 to the support tube 60. Other modes of attachment can also be used to connect the bracket 10 to the support tube 60 such as attachment by fasteners or staking.

As stated, the bracket 10 is connected to the rectangular support tube 60 in this example. The bracket 10 can alternatively be connected to other support structures of the seat 54 or directly to the underbody or other support structure of the vehicle. As shown, the bracket 10 is connected in a location such that the attachment portion 14 of bracket 10 is in a desired location. The desired location can be described by standards that apply to the location of child safety seat anchors. The attachment portion 14 is positioned at the desired location at or near the base of the seat 54 in the gap between a seat back 56 and a seat bottom 58.

Figure 3:
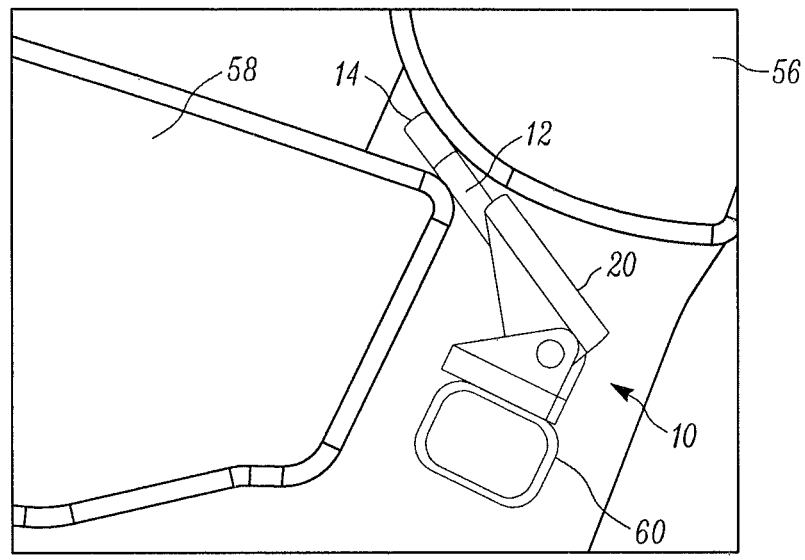
FIG. 3 is a magnified side view of the bracket of FIG. 1 attached to the example vehicle seat.

FIG. 3 shows a magnified illustration of the bracket 10 at this location. In this location and orientation, the attachment portion 14 is in the desired location in conformance with the child safety seat anchor system standard. Such a position of the attachment portion 14 is the upright or first position of the attachment portion 14.

Figure 4:
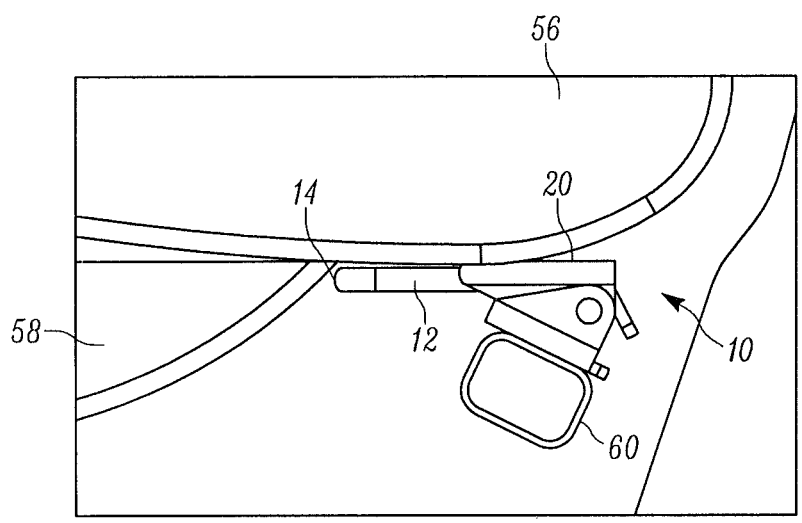
FIG. 4 is a magnified side view of the bracket shown in FIG. 1 wherein the seat is in a folded state and the bracket is in an example folded position.

FIG. 4 shows a circumstance in which the seat back 56 is folded downward toward the seat bottom 58. In such a circumstance, a downward force is exerted on the bracket 10 by the seat back 56. In response to such downward force, the support member 20 and the wire 12 are permitted to rotate downward. As shown in FIG. 4, the attachment portion 14 is in a lowered or second position in response to the downward force. As can be appreciated, when the seat back 56 is raised from the folded position to its original position, the biasing member 22 exerts an upward force that returns the support member 20 and the attachment portion 14 back to the first position as shown in FIG. 3.

Figure 5:
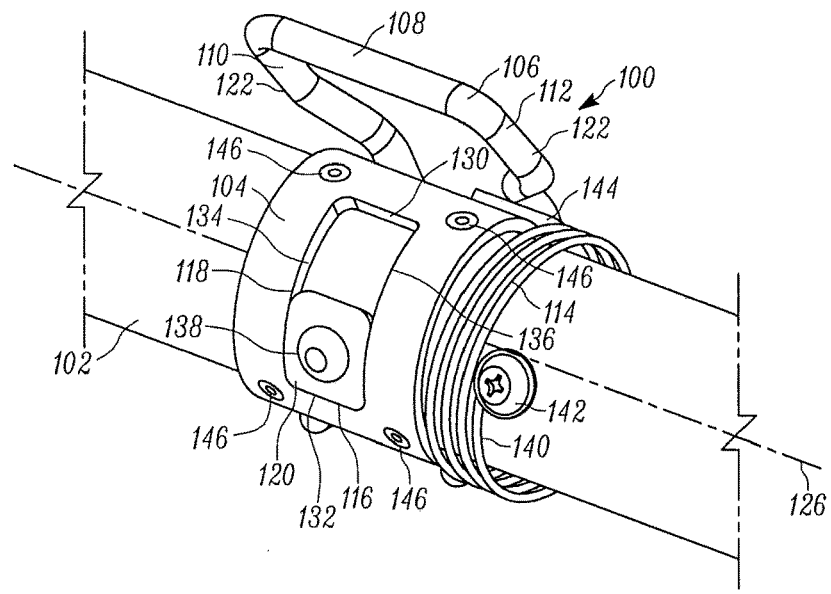
FIG. 5 is a perspective view of another example bracket of the present disclosure.

Referring now to FIG. 5, a second example folding anchor bracket 100 is configured to be used on a seat that has a cylindrical support bar 102. The bracket 100 includes a support member 104, a wire 106, a biasing member 114 and a travel-limiting surface 116. In this example, the wire 106 includes an attachment portion 108, a first leg 110 and a second leg 112. The attachment portion 108 is a horizontally elongated portion of the wire 106 and is oriented substantially parallel to a center axis 126 of the support bar 102. The first leg 110 and the second leg 112 extend from attachment portion 108 toward the support member 104. The first leg 110 and the second leg each include a linear portion 122 and an arcuate portion 124. The linear portion 122 extends away from the attachment portion 108 until the first leg 110 is tangentially positioned next to the support member 104. The arcuate portions 124 circumferentially follow the outside circumference of the support member 104. The second leg 112 is similarly configured to include a similar shape.

As further shown in FIG. 5, the arcuate portions 124 of the first leg 110 and the second leg 112 have the same length and/or wrap around approximately 50% of the circumference of the support member 104. In different example embodiments of the bracket 100, the arcuate portions 124 of the first leg 110 and the second leg 112 can have different lengths and wrap around more or less than 50% of the circumference of the support member 104. For example, the arcuate portions 124 can wrap around substantially all of the circumference of the support member 104 such that the arcuate portions 124 create a continuous circle around the support member 104. In other examples, the arcuate portions 124 encircle less than 50% of the circumference of the support member 104 and extend along the support member 104 with a sufficient length to securely connect the wire 106 to the support member 104.

As also shown in FIG. 5, the first leg 110 and the second leg 112 may also include a transition portion 128. The transition portion 128 is a portion of the first leg 110 and the second leg 112 that brings the two legs closer to one another before transitioning to the arcuate portion 124. This enables the bracket 100 to have a smaller width at the arcuate portions 124 than at the attachment portion 108. In other example brackets, the wire 106 may have other configurations such as only including the transition portion 128 on one side of the bracket 100 or including a transition portion that increases the overall width of the bracket 100.

Figure 6:
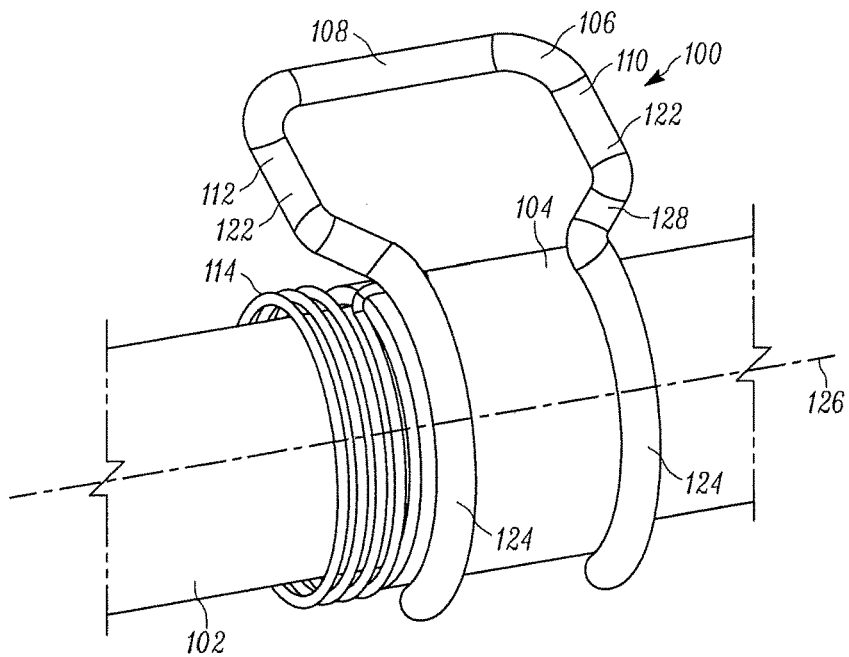
FIG. 6 is a rear view of the bracket of FIG. 5.

As shown in FIGS. 5 and 6, the support member 104 in this embodiment is cylindrical. The support member 104 is sized to fit over and around the support bar 102. The support member 104 is retained in position relative to the support bar 102 by a projection 120 as will be further explained below. The support member 104 has an inner diameter that is larger than the outer diameter of the support bar 102. The support member 104, in this example, includes three or more dimples 146 that project inward from the support member 104 and contact the support bar 102. The dimples 146 project inward from the outer surface of the support member 104 and into the inner surface of the support member 104. In this manner, the dimples 146 define a bearing surface at which the support member 104 contacts the support bar 102. As can be appreciated, the surface area of the dimples 146 is less than the surface area of the entire inner surface of the support member 104. Thus, when the support member 104 rotates around the support bar 102, the friction between the support member 104 at the dimples 146 is less than the friction that would result if the entire inner surface of the support member were to contact the support bar 102. The dimples 146 are spaced around the circumference of the support member 104 in two rings in this example. Other arrangements and quantities of the dimples 146 can also be used. In addition, other friction-reducing members can be placed between the support member 104 and the support bar 102 instead of the dimples 146. In other examples, a bushing or sleeve of polytetrafluoroethylene, nylon or other material can be used to facilitate the rotation of the support member 104 around the support bar 102.

Referring back to FIG. 5, one or more edges or surfaces of the support member 104 are configured to attach to the wire 106. As shown, the first leg 110 and the second leg 112 wrap around an outer surface of the support member 104 and are secured in position. The first leg 110 and the second leg 112 can be fixed to the support member 104 by any suitable joining method such as by welding.

In other examples, the support member 104 may have shoulders, flanges or other structures located at or near the first leg 110 and the second leg 112. In these examples, the support member 104 can be joined to the first leg 110 and the second leg 112 at the shoulders, flanges or other connection surface.

As further shown in FIG. 5, the example bracket 100 includes a slot 118, the projection 120 and the biasing member 114. The slot 118 includes the travel-limiting surface 116. The slot 118 is an elongated opening in the support member 104 and includes a top edge 130, a bottom edge 132, a first side edge 134 and a second side edge 136. The slot 118 is sized to cooperatively engage the projection 120. As can be appreciated, as the support member 104 rotates around the support bar 102, the top edge 130 and the bottom edge 132 of the slot 118 contact the projection 120 and limit the amount of rotation that can occur. The width of the slot 118 is sized so as to be only slightly larger than the width of the projection 120. This configuration restricts movement of bracket 100 in an axial direction along support bar 102.

In this example, the slot 118 is a rectangular slot extending around the support member 104. The projection 120 is a raised square projection with a rounded profile that conforms to the outer surface of the support bar 102. In this manner, the projection 120 is connected to the outer surface of the support bar 102 by a fastener 138 in the slot 118. The projection 120 can be a separate piece that is separate from and connected to the support bar 102 as shown. In other examples, other sizes, shapes and configurations of the slot 118 and the projection 120 can also be used such as rounded slots with circular projections, grooves with dimples or other suitable cooperative configurations. Still further, the slot 118 can be located at an edge of the support member 104 rather than in the center as shown in this example.

Referring back to FIG. 5, the travel-limiting surface 116 is located at one edge of the slot 118, namely, at bottom edge 132. When the travel-limiting surface 116 is contacting the projection 120, the attachment portion 108 is in the upright or first position. The bracket 100 also includes the biasing member 114 that exerts a force against the support member 104 or the wire 106 to bias the attachment portion 108 in the first position. As can be appreciated, the attachment portion 108 can be moved downward and rotated around a center axis 126 if an external force, such as by a seat back pressing against the wire 106, is exerted in a downward or forward direction. When such an external force is released, the biasing member 114 moves the attachment portion 108 back to its original state in the first position.

In this example, the biasing member 114 is a torsion spring with a first end 140 connected to the support bar 102 by a spring fastener 142 and a second end 144 that contacts the second leg 112 of the wire 106. Other types and configurations of the biasing member 114 can also be used. Flexible arms, elastomeric members or other springs can also be used in other embodiments of the biasing member 114.

Figure 7:
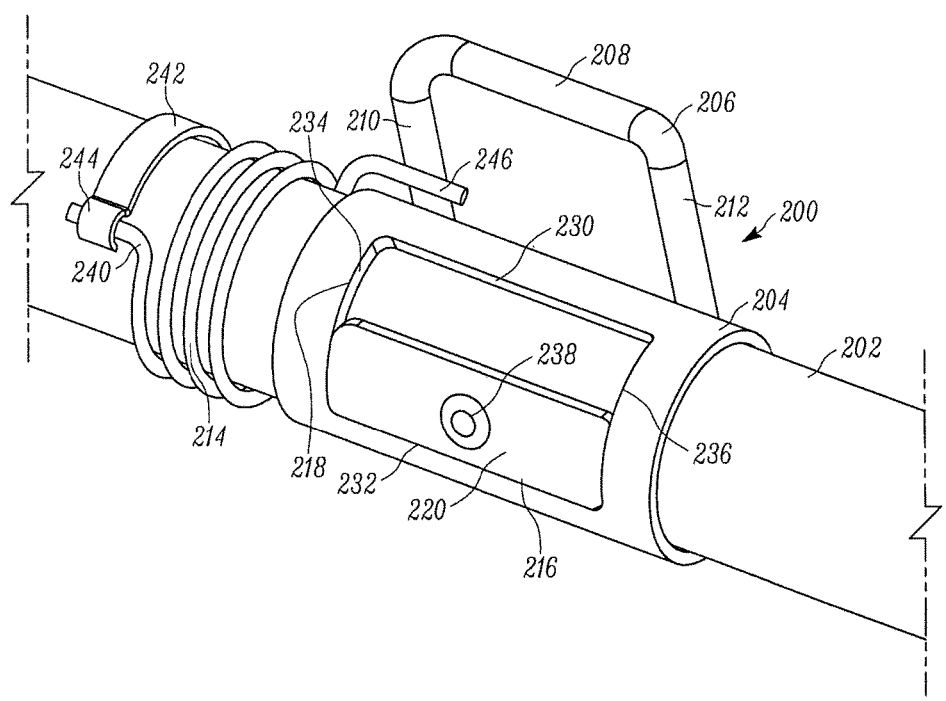
FIG. 7 is a perspective view of another example bracket of the present disclosure.

Referring now to FIG. 7, a third example of a folding anchor bracket is. shown. This example bracket is also a cylindrical bracket and is configured to attach to a cylindrical support bar 202. This example bracket 200 also includes a support member 204, a wire 206, a biasing member 214 and a travel-limiting surface 216. The bracket 200 includes many of the same features and structure as previously described with respect to the bracket 100. As shown, the support member 204 is a cylindrical component with an inner diameter larger than the outer diameter of the cylindrical support bar 202. As such, support member 204 is received over the outer circumference of the support bar 202. The support member 204 can include dimples or other friction-reducing member(s) between the support member 204 and the support bar 202 as previously explained with respect to the example bracket 100. The support member 204 is secured in position relative the support bar 202 by a projection 220 as will be further explained below.

The wire 206 is a formed length of steel wire in this example and is secured to the outer surface of the support member 204 via welding, staking, or other suitable joining method. The wire 206 includes a first leg 210, a second leg 212 and an attachment portion 208. The attachment portion 208 is oriented horizontally in the vehicle such that the attachment portion is positioned substantially parallel to a center axis of the support bar 202. The attachment portion 208 serves as attachment location for the child safety seat. The first leg 210 and the second leg 212 extend from the attachment portion 208 toward the support member 204. The first leg 210 and the second leg 212 can include an arcuate portion (not shown) that wraps around the support member 204.

The travel-limiting surface 216 is a feature of the bracket 200 that limits the movement of the bracket 200 relative to the support bar 202. The travel-limiting surface 216 is located at an edge of a slot 218. The slot 218 is a rectangular opening in the support member 204. The slot 218 includes a top edge 230, a bottom edge 232, a first side edge 234 and a second side edge 236. The slot 218 is sized so as to cooperatively engage the projection 220. The projection 220 is connected to the support bar 202 by a fastener 238. The projection 220 is raised above the outer surface of the support bar 202 and engages the slot 218. The width of the projection 220 is smaller than the width of the slot between the first side edge 234 and the second side edge 236. This permits the projection 220 to limit axial movement of the support member 204 along the support bar 202. The upper and lower sides of the projection 220 engage the top edge 230 and the bottom edge 232 of the slot 218 when the support member 204 is rotated about the support bar 202.

As shown in FIG. 7, the bracket 200 is in the first position. At this position, the travel-limiting surface 216 is engaging the bottom edge 232 of the slot 218. The biasing member 214 biases the bracket 200 in the first position. The biasing member 214 is a torsion spring in this example. The biasing member 214 is attached at a first end 240 to the support bar 202 by a clip 242. The clip 242 can be attached to the support bar by any suitable attachment method such as by a fastener, welding, staking, crimping or the like. The clip 242 includes a grip portion 244 that wraps around the first end 240 of the biasing member 214 and secures the first end 240 relative to the support bar 202. The biasing member 214 also includes a second end 246. The second end 246 contacts the wire 206 at the first leg 210. In this manner, the biasing member 214 exerts a force against the wire 206 and biases the bracket 200 in the first position as shown in FIG. 7. The biasing member 214 can have other configurations. In other examples, the biasing member 214 can be a flexible arm, an elastomeric member or a different type of spring.

Example child safety seat anchor brackets 100 and 200 function similarly to that previously described and provide similar advantages. The cylindrical child safety seat anchor brackets 100 and 200 rotate from a first position in which the attachment portion 108, 208 is in a desired position for attachment to a child safety seat to a second lowered position when a foldable seat is lowered to a folded position. The folding functionality of the anchor brackets prevents deformation or damage to seat cushions, seat trim and other surrounding components as previously described.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A bracket for connection of a child safety seat to a foldable vehicle seat configured to fold from an upright state to a folded state, the bracket comprising:
    a wire including a first leg, a second leg and a horizontal attachment portion connected to the first leg and the second leg, the attachment portion configured to connect to the child safety seat when the attachment portion is in a first position;
    a support member connected to the first leg and the second leg, the support member configured to couple the wire to the vehicle seat while permitting movement of the attachment portion from the first position to a second position, wherein the first position is different from the second position;
    a biasing member in contact with at least one of the support member and the wire and configured to bias the attachment portion of the wire toward the first position; and
    a cylindrical post positioned in the support member parallel to the attachment portion to define an axis of rotation of the bracket such that the attachment portion is rotated from the first position to the second position about the axis of rotation.

2. A bracket for connection of a child safety seat to a foldable vehicle seat configured to fold from an upright state to a folded state, the bracket comprising:
    a wire including a first leg, a second leg and a horizontal attachment portion connected to the first leg and the second leg, the attachment portion configured to connect to the child safety seat when the attachment portion is in a first position;
    a support member connected to the first leg and the second leg, the support member configured to couple the wire to the vehicle seat while permitting movement of the attachment portion from the first position to a second position, wherein the first position is different from the second position; and
    a biasing member in contact with at least one of the support member and the wire and configured to bias the attachment portion of the wire toward the first position,
    wherein the support member further includes a first wall, a second wall, and a back wall connected to the first wall and the second wall, the first wall disposed orthogonally to the back wall to define a first corner and the second wall disposed orthogonally to the back wall to define a second corner, wherein the first leg is connected to the support member at the first corner and the second leg is connected to the support member at the second corner.

3. The bracket of claim 2 further comprising a cylindrical post, wherein a first end of the post is inserted through a first opening in the first wall and a second end of the post is inserted through a second opening in the second wall to define an axis of rotation of the bracket such that the attachment portion is rotated from the first position to the second position about the axis of rotation.

4. The bracket of claim 3 wherein the post is oriented parallel to the attachment portion of the wire.

5. The bracket of claim 4 wherein the biasing member is a torsion spring located on the post.

6. The bracket of claim 5 wherein:

the support member includes a limiting wall that includes a travel-limiting surface, the travel-limiting surface configured to prevent movement of the attachment portion past the first position when the attachment portion is moved from the second position toward the first position; and the limiting wall is connected to and extends from the back wall and is disposed between the first wall and the second wall.

7. The bracket of claim 6 further comprising a connector member, the connector member including a base, a third wall and a fourth wall, wherein the third wall and the fourth wall are connected to the base and extend orthogonally therefrom, the base is configured to connect to the vehicle seat and the third wall and the fourth wall define openings receiving the first end and the second end of the post to rotatably connect the support member to the connector member.

8. The bracket of claim 7 wherein the travel-limiting surface contacts the base of the connector member when the attachment portion is in the first position.

9. The bracket of claim 8 wherein, when the attachment portion moves from the first position to the second position, the wire does not interfere with the foldable vehicle seat.

* * * * *